United States Patent [19]

Moran

[11] Patent Number: 4,627,504

[45] Date of Patent: Dec. 9, 1986

[54] METHOD FOR TAKING TARE WEIGHTS IN AUTOMATIC COMBINATION WEIGHING MACHINES

[75] Inventor: Michael J. Moran, Raleigh, N.C.

[73] Assignee: USM Corporation, Farmington, Conn.

[21] Appl. No.: 742,553

[22] Filed: Jun. 7, 1985

[51] Int. Cl.$^4$ .................... G01G 19/22; G01G 13/24; G01G 13/14
[52] U.S. Cl. ........................................ 177/1; 177/25; 177/114; 177/165
[58] Field of Search ...................... 177/1, 25, 114, 165

[56]  References Cited

U.S. PATENT DOCUMENTS 4,344,492  8/1982  Hirano ........................... 177/165 X
4,437,527  3/1984  Omae et al. ........................... 177/25
4,465,149  8/1984  Kawashima et al. ........... 177/165 X Primary Examiner—George H. Miller, Jr.
Attorney, Agent, or Firm—Alan N. McCartney

[57]  ABSTRACT

An improved method of taking tare weights is provided for automatic weighing machines. Periodically, the sequence of weighing cycles is interrupted in order that a tare cycle may be executed. During the tare cycle, all the weighing buckets of the weighing machine which were emptied in the last weighing cycle are weighed in their empty state. The new values for the tare weights are stored and the old values are discarded. By introducing a tare cycle between successive weighing cycles, all weighing buckets are available in each weighing cycle for finding the best combination.

9 Claims, 4 Drawing Figures

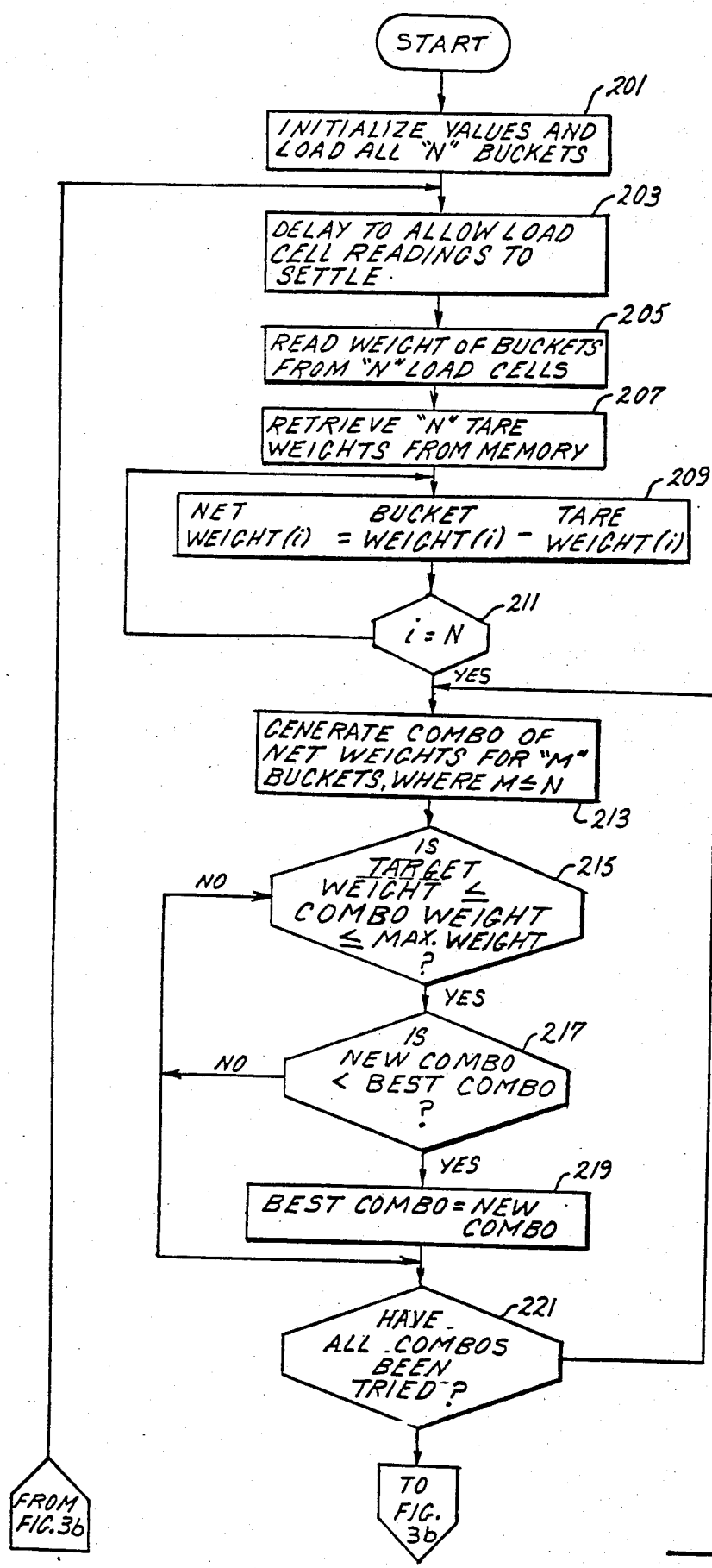

METHOD FOR TAKING TARE WEIGHTS IN AUTOMATIC COMBINATION WEIGHING MACHINES

TECHNICAL FIELD

This invention relates generally to methods for weighing products and, more particularly, to computerized scales for weighing products just prior to packaging by an automatic packaging machine.

BACKGROUND

In general, a computerized scale of the foregoing type includes a series (e.g., ten) of so-called weighing buckets each associated with an underlying load cell or other means for producing an electrical signal representative of the weight of product in the bucket. Located above each weighing bucket is a holding bucket which contains a quantity of the product to be packaged. During each cycle, each empty weighing bucket is filled with product by momentarily opening the overlying holding bucket and allowing the product to fall into the weighing bucket. The weight of the product dropped into each weighing bucket is substantially less than the total weight of product which subsequently is placed in each package by the packaging machine.

After all of the weighing buckets have been filled, microprocessor-based control circuitry responds to the weight signals produced by the different load cells, adds the weights in various combinations of weighing buckets and then selects the particular combination of buckets that meets the minimum statistical weight for the package to be filled while providing the least excess weight. The weighing buckets of that particular combination then are emptied and the product therein is delivered to the packaging machine to be deposited in the package. Only those weighing buckets previously emptied are refilled by dumping from their respective holding buckets during the succeeding cycle.

The potential accuracy of computerized scales has not been realized by prior art scales since it has been necessary to reduce the number of available buckets in a weighing cycle in order to update the tare weights of the buckets. Because of product buildup and other well-known problems, the tare weights of the weighing buckets may change over a number of weighing cycles. In order to compensate for dynamic changes in the tare weights of the weighing buckets, new tare weights must be periodically calculated.

Until now, to accomplish a tare weight calculation, the weighing buckets emptied during the last weighing cycle were identified and one of the buckets was not refilled in the following cycle. By not refilling this emptied weighing bucket, its weight in the next cycle would accurately represent its tare weight. Accordingly, the weight measured in the next cycle for the empty bucket was stored by the microprocessor-based control circuitry as the bucket's updated tare weight. In order to help insure the tare weights of all the buckets were periodically updated, prior systems typically kept track of the elapsed time since the last updating of the tare weight for each bucket. The system chooses the bucket whose tare weight should be updated in the next weighing cycle by identifying the bucket with the longest elapsed time.

Although the foregoing method adequately updated the tare weights of the weighing buckets, it unfortunately reduced the possible weight combinations in the tare weight cycle since a lesser number of combinations of buckets were available whose net weights could be combined to give a total weight within the desired range. In general, the unavailability of one bucket during each weighing cycle reduced the number of possible combinations by one half. Consequently, a significant degree of accuracy was sacrificed. Moreover, the overall speed of packaging was reduced since the number of reduced combinations increased the chance that no combination of bucket weights would give a weight total within the acceptable range; if no acceptable combination was found, a package was not loaded for the cycle, and the overall packaging speed was reduced.

In a particular example, for a system having ten weight buckets, the tare weight of one bucket is measured each cycle. Therefore, only nine buckets are available each cycle for providing weight combinations. If the tenth bucket was available each cycle, the possible number of weight combinations doubles to 1,023. But with nine buckets available, only 511 combinations are possible. It can be easily appreciated that such a reduction represents a substantial loss of accuracy.

SUMMARY OF THE INVENTION

The general aim of the present invention is to provide an improved method for updating tare weights of weighing buckets which does not reduce the number of possible weight combinations in a cycle.

It is also an object of the invention to provide a method of updating tare weights in a cyclic weighing apparatus which feeds a packaging machine wherein the updating of the tare weight does not substantially impact the overall speed of the packaging machine.

A more detailed object of the invention is to achieve the foregoing by providing a tare weight cycle between successive groups of weighing cycles of the weighing apparatus in which the tare weights of all the buckets emptied during the last weighing cycle are measured. Because no product is added to those particular buckets during the cycle, when fresh tare weights for several buckets are sensed and stored, the stolen tare cycle time can be considerably less than the time period of an ordinary weighing cycle, e.g., one half the time of a weight cycle. By introducing a tare cycle between successive groups of weighing cycles, the Nth bucket in a N bucket weighing system is freed to be included in the weight combination during every weight cycle, thereby doubling the number of possible combinations and, consequently, significantly reducing the average deviation from the target weight of the actual aggregate weight of the selected combination.

These and other objects and advantages of the invention will become more apparent from the following detailed description when taken in conjunction with the accompanying drawings.

BRIEF DESCRIPTION OF THE DRAWINGS

FIGS. 3a and 3b are flowchart diagrams for the programming of the microprocessor-based system of FIG. 2 in order to implement the method according to the invention.

Figure 1:
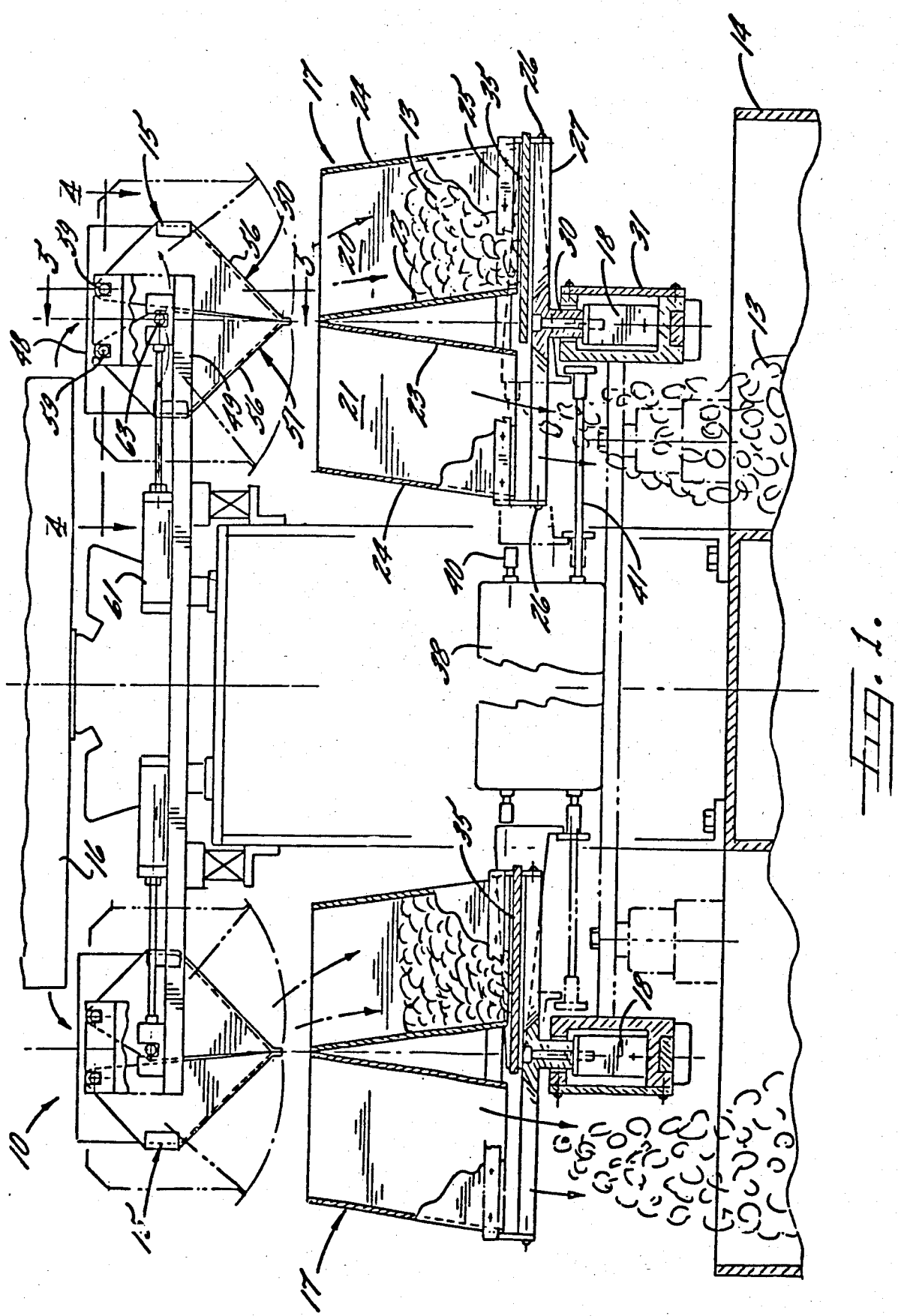
FIG. 1 is an elevational view of a weighing apparatus for use in conjunction with the method of the present invention, certain parts being broken away and shown in section.

While the invention is susceptible of various modifications and alternative constructions, the invention is shown in the drawings and herein described in detail with reference to the preferred embodiment, but it is to be understood that the invention is not intended to be limited to the specific form disclosed. On the contrary, it is intended here to cover all modifications and alternative constructions falling within the spirit and scope of the invention as expressed in the appended claims.

DETAILED DESCRIPTION OF THE PREFERRED EMBODIMENT

Turning first to FIG. 1, the invention is preferably practiced in association with the apparatus 10 for weighing product 13 prior to delivery of the product to the filling funnel 14 of an automatic packaging machine of the type disclosed, for example, in Monsees et al. U.S. Pat. No. 4,423,585. The product may be a snack food such as potato chips which are separated into batches, weighed and then delivered through the funnel and deposited into packages made automatically by the packaging machine (not shown).

The weighing apparatus 10 which has been specifically shown forms part of a computerized scale which weighs the product 13 and insures that the batch of product deposited in each package always meets a specified minimum or target weight while exceeding that weight by as little as practically possible. In general, the weighing apparatus 10 includes metering means in the form of upwardly opening holding buckets 15 adapted to contain product received from an overhead supply which has been indicated schematically at 16. The holding buckets are periodically opened and drop a quantity of product into underlying weighing buckets 17 which rest on load cells 18 or other force-to-electrical signal transducers. The signal produced by each load cell 18 is representative of the weight of the product in the overlying bucket 17.

FIG. 1 shows two groups of holding buckets 15, weighing buckets 17 and load cells 18, there being one group shown at each side of the funnel 14 so that each weighing bucket may drop its product into the funnel after the product has been weighed. Additional groups of holding buckets 15 (not shown) are located at each side of the funnel 14 and thus the overall scale includes a total of N groups with the weight signal from each of the N load cells 18 being transmitted to the microprocessor-based system 100 of FIG. 2 for processing in accordance with the steps of the flowchart in FIGS. 3a and 3b. A typical scale includes eight additional groups of holding buckets 15 that total to ten groups and, correspondingly, ten load cells.

The weight of the product deposited in each weighing bucket 17 from its overlying holding bucket 15 is only a fraction of the total weight of the product with which each package is ultimately to be filled. For example, approximately three ounces of product may be dropped into each weighing bucket while the target weight to be loaded into each package may be fourteen ounces of product.

After all of the weighing buckets 17 have received product 13, the microprocessor-based system 100 adds all possible combinations of the weights represented by the signals from the load cells 18 and selects the best combination of weights to meet the target package weight while minimizing overfilling. The microprocessor-based system 100 then produces a signal to cause emptying of those particular weighing buckets 17 which make up the selected combination. The emptied buckets 17 are refilled and the cycle repeated. In a given cycle, for example, the system may cause a number M of the weighing buckets 17 to empty into the funnel 14 while the remaining N-M buckets remain filled until selected and emptied during subsequent cycles. With each weighing bucket 17 formed by two generally upright and side-by-side compartments or containers 20 and 21, a bucket can be dumped and filled simultaneously.

In order to provide for simultaneous dumping and filling of a weighing bucket 17, a door 35 is mounted to shuttle back and forth beneath the lower ends of the containers 20 and 21 of each weighing bucket. When the door is in one position, it closes the container 20 and opens the container 21 as shown at the right-hand side of FIG. 1. When the door is shifted to its other position, it opens the container 20 and closes the container 21 (see the left-hand side of FIG. 1).

In the present instance, the door 35 is mounted for back and forth horizontal shifting between its two positions by two spaced guide rods (not shown) secured to and located beneath the frame 25. Shifting of the door 35 between its positions is effected by mechanism 38 which de-couples from the door during the weighing portion of the cycle so that the accuracy of the weigh signal will not be affected by the shifting mechanism 38 and vibrations therein. The shifting mechanism 38 includes an upper and normally retracted reciprocating rod 40 and a lower and normally extended reciprocating rod 41, there being pneumatic cylinders (not shown) included in the shifting mechanism 38 for reciprocating the rods.

Figure 2:
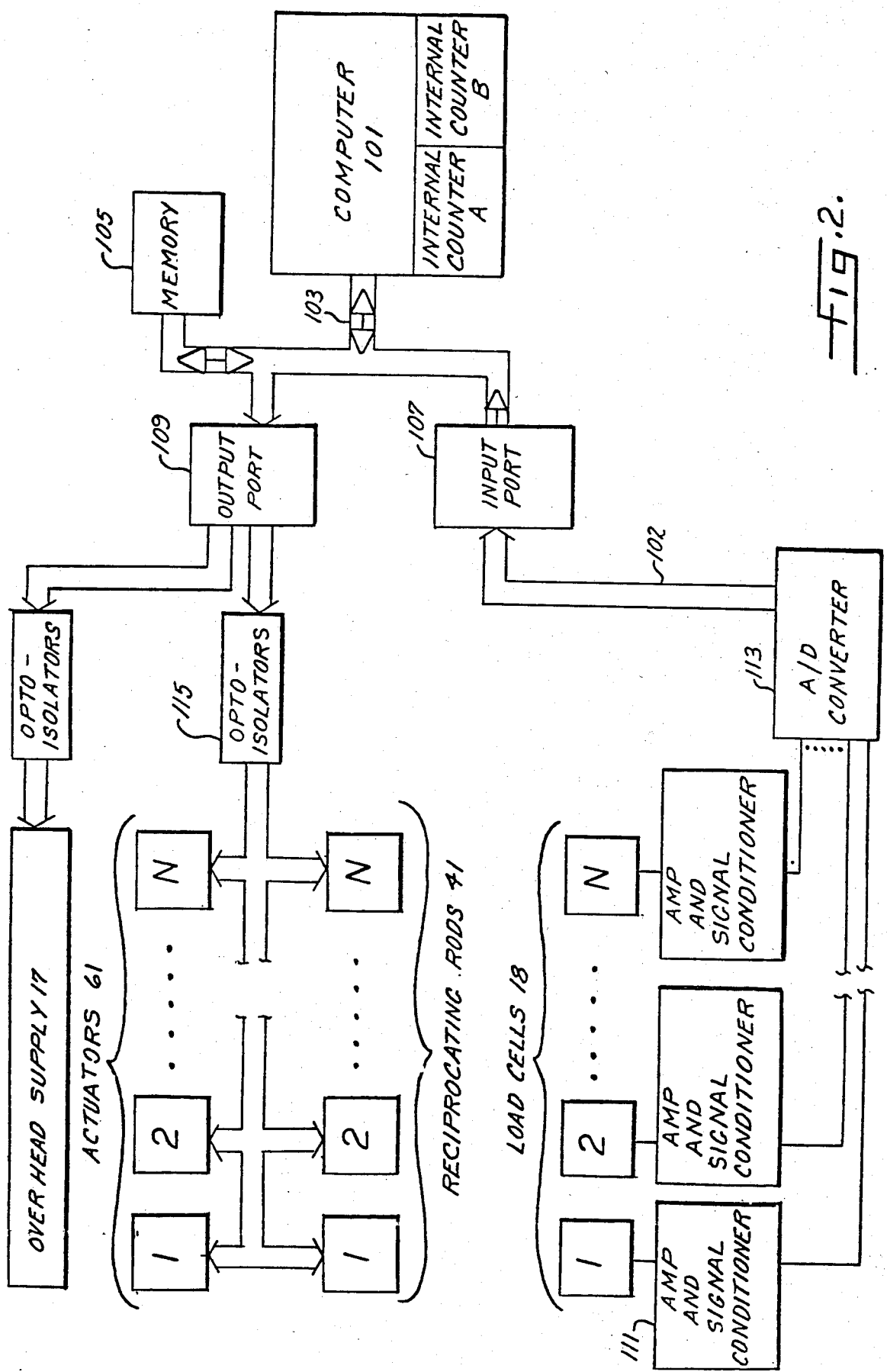
FIG. 2 is a schematic diagram of the microprocessor-based system for controlling the weighing apparatus of FIG. 1 in accordance with the method of the invention.

In the microprocessor-based system 100 of FIG. 2, a microprocessor 101 receives, by way of data bus line 102, signals from the load cells 18 (shown in FIG. 1) which represent weights from each of the N buckets comprising the weighing apparatus 10. The microprocessor 101 subtracts a tare weight stored in memory 105 from each measured weight in order to provide a net weight which is indicative of only the weight of the product in the corresponding bucket 17. In a conventional manner, a bi-directional bus 103 connects the microprocessor 101 with the memory 105 in order that the data representative of the tare weight for each of the buckets 17 may be retrieved from the memory. Of course, the memory 105 also provides storage for other data related to system operation as is conventional practice in programming microprocessor-based systems such as the one illustrated in FIG. 2. The microprocessor 101 may, for example, be a Z80 microprocessor manufactured by Zilog Inc.

From the data representative of the net weight for each of the buckets 17, the microprocessor 101 calculates combinations of the net weights in search of a total weight which exceeds the target weight by the smallest amount. When the best combination weight is found and when the combination weight is less than a predetermined maximum weight, the microprocessor 101 generates a dump signal for energizing the actuators 61 and reciprocating rods 41 corresponding to the M buckets 17 of the selected combination, thereby dumping the best weight of product 13 into the funnel 14.

When the dump signal is produced by the microprocessor 101, the mechanism 38 causes the door of each weighing bucket in the selected combination 35 to shift from right to left (in the right-hand weighing bucket as viewed in FIG. 1) toward a position opening the container 20 and closing the container 21. At substantially the same time the door 35 begins moving, the dump signal causes the actuator 61 to begin opening a clamshell 51 of the associated holding bucket 15 to enable product to fall from the holding bucket into the container 21. Thus, product 13 starts falling out of the container 20 at substantially the same time product starts falling into the container 21. Although the clamshell 51 starts opening before the door 35 fully closes the container 21, the door catches the falling product as the door moves from right to left. The clamshell 51 is closed at approximately the same time the door 35 reaches a position fully closing the container 21. The succeeding cycle then begins and new weight signals are received and processed by the microprocessor 101. In order to reload the holding buckets 15, the microprocessor 101 activates the overhead supply 16 so as to deliver an approximate but not exact predetermined quantity of product 13 to the designated holding buckets 15.

The next dump cycle of the right-hand weighing bucket 17 then proceeds immediately if the bucket is included in the newly selected combination. Thus, the door 35 is shifted from left to right by the mechanism 38 to a position opening the container 21 and closing the container 20. At substantially the same time the door starts moving, the actuator 61 starts opening the clamshell 50 so that product begins falling into the container 20 as product begins falling out of the container 21. The clamshell 50 closes at about the same time the door fully closes the container 20.

In accordance with the invention, the foregoing sequence of product weighing cycles is periodically interrupted (say, after each group of eighty successive product weighing cycles) by a tare weight cycle during which all of the M buckets emptied in the last product weighing cycle are measured for tare weight; the weights of product in the remaining buckets are ignored, no calculation is made for a weight combination, and no dumping of product into the funnel 14 occurs. In anticipation of the tare cycle, the product weighing cycle immediately preceeding the tare cycle does not fill one of the side-by-side compartments of the emptied buckets 17. By not filling one of the side-by-side compartments in response to the dumping of the M buckets 17, the weighing apparatus 10 enters the tare cycle with M empty buckets whose corresponding load cell signals represent their tare weights. After the weighing apparatus 10 stabilizes, the tare weights of the emptied weighing buckets 17 are read from the corresponding load cells 18 by the microprocessor-based system 100. In order to return to the next normal product weighing cycle after the tare weights have been updated, the empty weighing buckets 17 are filled with a fresh batch of product at the conclusion of each tare weight cycle.

By providing a short tare cycle which interrupts the normal product weighing cycles, all N buckets of the weighing machine are available during product weighing cycles to provide the greatest combination of possible weights, i.e., $2^N - 1$. By freeing the one bucket in a product weighing cycle which otherwise would be withheld from the combination in order to update its tare weight, the invention doubles the number of possible weight combinations in each product weighing cycle and therefore allows for increased accuracy such that the average excess weight or overage for the selected best combinations is substantially reduced.

Because no product is either added to or dropped from the weighing bucket 17 during the tare weight cycle, the tare cycle can be significantly shorter than the product weighing cycle. This short time period prevents the interruption of packaging caused by the tare cycle from significantly detracting from the speed of packaging. For example, with a product weighing cycle frequency of 80 cycles per minute, the tare weight cycle takes approximately one half of a product weighing cycle; therefore, the actual weighing rate of product is 79.5 weighing cycles per minute if a tare cycle is executed every 80 weighing cycles (i.e., once a minute) which represents less than a one percent sacrifice in cycle speed. Of course, an intentional small time delay occurs when tare weight is updated because the interrupted weighing cycle dumps and refills sequentially instead of simultaneously, as in uninterrupted cycles.

In addition to the foregoing advantages realized by providing a tare cycle between successive product weighing cycles, the frequency of the updating of the tare weight for a particular bucket is not adversely affected. For example, for a system having ten weighing buckets, a particular bucket is tared on average every 1.15 tare cycles. For a system which executes a tare cycle eyery eighty weighing cycles, a particular bucket 17 can be expected to have its tare weight updated, on average, every 92 product weighing cycles. Obviously, a reduction of the number of weighing cycles between successive tare cycles will reduce the average number of weighing cycles between an updating of the tare weight for each bucket. Depending on the severity of product buildup characterized by the product being packaged, the average time between the updating of the tare weight may be increased or decreased.

In order to implement the control of the overhead supply 16, the reciprocating rods 41 and the actuators 61, the microprocessor 101 delivers control signals to these devices via the bi-directional bus 103 and the output port 109. Gross weight data for each of the N buckets is received by the microprocessor 101 via input port 107. Each of the N load cells 18 is associated with an amplifier and signal conditioner 111 which receives the raw signal from the load cell 18, filters and amplifies the signal in order to prepare the signal for the analog-to-digital converter 113 (hereinafter referred to as A/D converter). In the A/D converter 113, the analog signal is converted to a digital signal compatible with the microprocessor 101. From the A/D converter 113 the gross weight signals, in a digital format, are delivered to the microprocessor 101 by way of input port 107 and bi-directional bus 103.

Once the microprocessor 101 has received the measured gross weights corresponding to the respective N buckets, digital signals stored in the memory 105 and corresponding to the tare weights for each of the N buckets are subtracted from the gross weight signals from the respective buckets in order to provide net weight signals which reflect the weight of the product held in the buckets 17. Once the combination of M net weights closest to the target weight is determined, the microprocessor 101 provides dump signals to the several buckets in the selected combination via the output port 109 by way of the bi-directional bus 103. These dump signals are converted by opto-isolators 115, or like devices, to analog voltages which activate the movement of the actuators 61, reciprocating rods 41 and the overhead supply 17. In response to the appropriate dump signals from the microprocessor 101, the M selected buckets 17 holding the product corresponding to the best weight combination are dumped into the funnel 14.

In keeping with the invention, the cyclic repetition of the sequence of weighing, finding the best combination, dumping and filling is continuously repeated until either a predetermined count has occurred or until a predetermined time period has elapsed. When the microprocessor 101 senses either the predetermined count or the lapse of a predetermined time period from an internal counter or timer A of the microprocessor 101, the succession of weighing cycles is interrupted; instead of simultaneously filling the second compartment of the M selected buckets 17 as the first compartment is dumped, the corresponding holding buckets 15 are not opened by the actuators 61 and therefore the M buckets which were dumped in the weighing cycle are not refilled with product.

Since the M buckets 17 just dumped are not refilled, their weight signals received by the microprocessor 101 represents the tare weights of the buckets. These weights replace the old tare weights, for these buckets 17, which are stored in the memory 105 of the microprocessor 101. After the tare weights for the M buckets 17 have been updated, they are then refilled by activation of the appropriate actuators 61 which open the appropriate holding buckets 15 to fill the empty compartments of the buckets which are closed by doors 35. The system then returns the weighing apparatus 10 to the normal weighing cycle mode which will continue to repeat until the internal counter or timer A again indicates that a tare cycle should be executed.

Figure 3B:
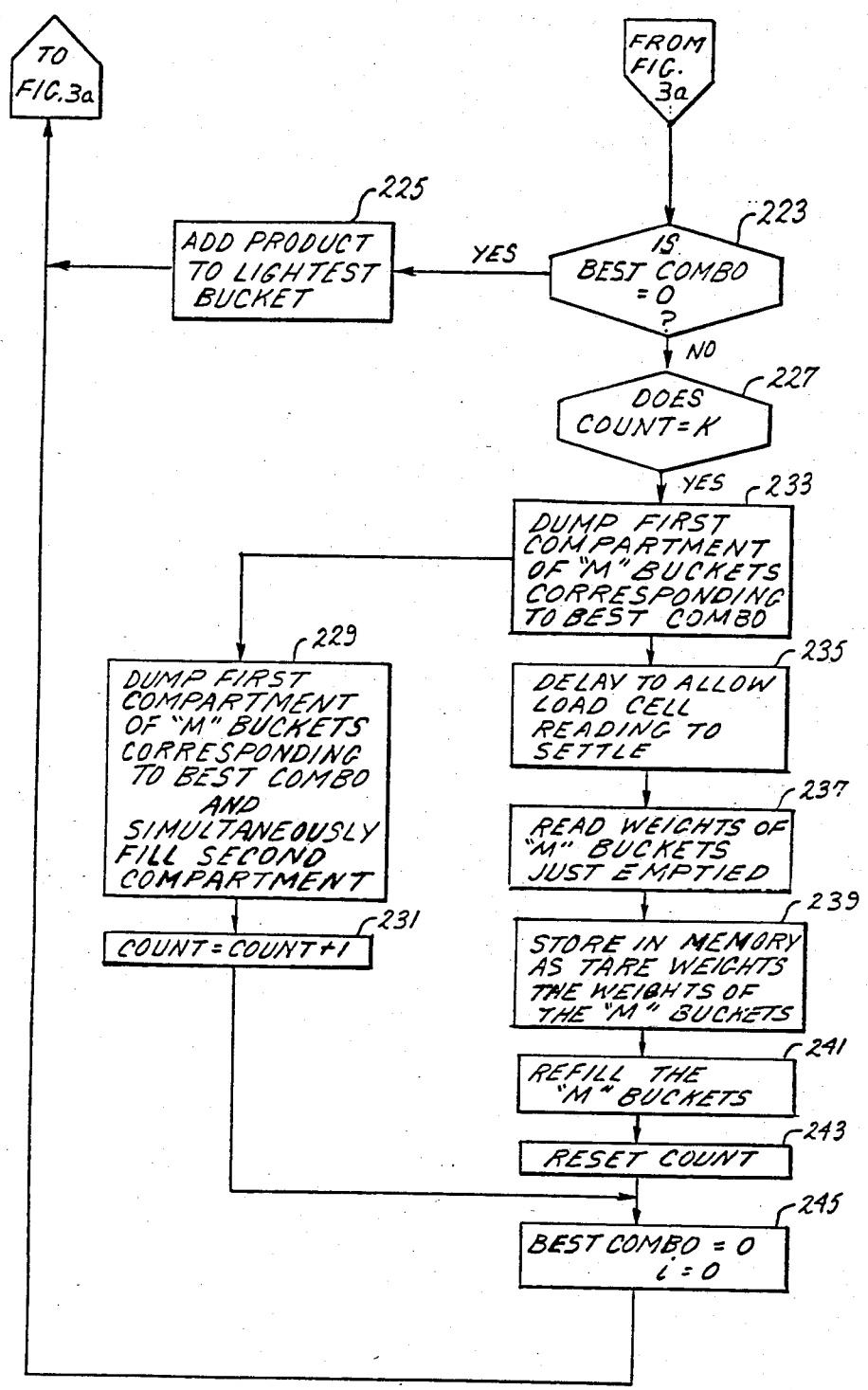

In order for the microprocessor-based system 100 to operate in accordance with the invention, it is programmed to execute iterations of a stored program (held in memory 105) and made up of the steps illustrated in the flowchart of FIGS. 3a and 3b. In step 201, the system values are initialized and one of the compartments 20 or 21 of each of the N buckets 17 is loaded in order to prime the weighing apparatus 10. To allow sufficient time for the dissipation of transients such as vibrations from the loading of product into the buckets 17, a time delay is inserted at step 203 between the loading of product and the reading of the signals from the load cells 18 by the microprocessor 101. In step 205, the microprocessor 101 receives binary data by way of the A/D converter 113 which corresponds to the gross weights of the buckets 17 as measured by the analog signals of the load cells 18. Stored in an array format in memory 105 are tare weights for each of the buckets 17. By subtracting the data for tare weight from the data for gross weight in steps 207, 209 and 211, the microprocessor 101 generates data for each bucket which corresponds to a net weight or a product weight. In a conventional manner, an internal counter B is used in steps 209 and 211 for identifying the tare weight data cell in the array which corresponds to a particular bucket.

From the net weight data for each of the buckets 17, the program begins a sequence, illustrated in step 213, of combining M net weights in every possible combination where M is less than or equal to N. For example, where the weighing system comprises ten buckets, the total number of weight combinations is $2^{10}-1$ (one is subtracted from the total combinations since the combination of all empty buckets is meaningless). One way for the microprocessor 101 to insure each combination of buckets 17 is tried is to use an internal register having ten bits wherein each bit corresponds to a bucket 17 and wherein a first binary state of each bit corresponds to a selection of the net weight for that bucket while the other binary state corresponds to the non-selection of the net weight of that bucket. By selecting M buckets 17 in accordance with the binary state of the ten bits in the internal register, the microprocessor 101 will try all possible combinations when the register is incremented from zero to its full count.

In step 215, the predetermined target weight and the predetermined maximum weight stored in memory 105 are compared to the total weight found from the combination of net weights of the selected combination. If the target weight is less than or equal to the combination weight and if the combination weight is less than or equal to the maximum weight, then the combination is a possibility for packaging. In order to insure that the combination within the range selected in step 250 is the best combination (i.e., closest to the target weight), step 217 compares the weight of the new combination with the weight of the last combination which was also within the minimum and maximum limits. Of course, if this is the first combination chosen in a cycle, the previous best combination is zero and the new combination is the best by default.

If it is found in step 217 that the total weight of the net weights from the selected combination of M buckets 17 is closer to the target weight then the weight of a previous acceptable combination, then the most recent combination replaces the previous combination as the best combination in step 219. If the total weight of the present combination either is not within the limits set up in step 215 or is not less than the previous best weight combination, the program will bypass the step wherein the present combination replaces the previous best combination, and the program proceeds to step 221 wherein the combinations are checked to determine if any combinations remain to be tried. If more combinations exist, the program returns to step 213 wherein a new combination is generated, and its total net weight is checked in steps 215 and 217.

Once all the combinations of net weights have been tested, the program checks in step 223 to determine if at least one combination was found to be within the range set out in step 215. If no combination has been found to be within the range, then the computer 101 commands the holding bucket 15 to add product to the lightest bucket 17 in step 225.

In keeping with the invention, if an internal count kept by the counter A of the microprocessor 101 reaches a value K (K is eighty in the example given above) in step 227, the program bypasses the ordinary weighing cycle steps 229 and 231 in order to update the tare weights of the buckets chosen as having the best combination in the present weighing cycle. In step 233, the compartments of the M buckets comprising the best net weight combination are dumped, but the actuators 61 are not commanded by the microprocessor 101 to open the corresponding holding buckets 15; therefore, the buckets 17 which are emptied in step 233 are not refilled. In step 235, the microprocessor 101 causes the system to delay further execution in order that transients in the output signals from the load cells 18 caused by vibrations of the weighing apparatus and the like during the dumping of product can be dissipated before proceeding.

After the transients have had sufficient time to dissipate, the microprocessor 101 reads the digital data in step 237 corresponding to the analog signals emanating from the load cells 18 of the buckets 17 just dumped. Since the buckets 17 chosen in the last combination are empty, the signals from the load cells 18 correspond to the tare weights for those buckets. Therefore, in step 239 the microprocessor 101 stores these new tare weights in the appropriate locations of the tare weight array inside of the memory 105.

In step 241, the microprocessor 101 commands the appropriate holding buckets 15 to refill the M buckets chosen by the microprocessor in the last calculation of a best combination. From step 241, the count K of internal counter A is reset to zero in step 243 and the tare weight cycle then returns the weighing apparatus 10 to step 245 which prepares the apparatus for entry into a new weighing cycle.

Referring back to step 227, if the internal counter A of the microprocessor 101 has not reached the count of K, then the weighing cycle is executed in step 229 wherein the product is dumped from the first compartment of the M selected buckets 17 and the corresponding holding buckets 15 simultaneously fill the second compartment. Of course, in order to update the internal counter A, the count is incremented in step 231. Before beginning a new cycle, house cleaning chores are executed in step 245 by resetting the best combination and the incremental value i of the internal counter B.

Because of severe product buildup in the buckets 17 for some items (e.g., frozen fish or frosted donuts) and because it is statistically possible (but highly unlikely) that a particular bucket may not be tared for a long period of time, it may prove necessary to force a particular bucket to be one of the buckets chosen in the next tare cycle. To accomplish the forcing of a particular bucket into the group of M buckets to be tared in the next tare cycle, each bucket 17 may have assigned to it a memory timer (not shown) which is reset when the bucket is chosen for a tare cycle. If the timer for a bucket 17 times out before that bucket is selected in a tare cycle, the microprocessor-based system 100 reacts to the time out by preselecting the bucket as one of the M buckets to be included in the next tare cycle. Since the statistical chances are very small that a particular bucket 17 will be missed for a sufficiently long period of time to cause a significant change in the tare weight, only the most troublesome products matched with a marginal tare weight cycle intervals should require this additional program feature.

From the foregoing, it will be apparent that the present invention brings to the art a new and improved method of updating tare weight which does not hinder accuracy as did the prior art methods. In addition, the short length of time of a tare cycle according to the invention, when coupled with the extremely fast operation of the weighing apparatus 10, results in an insignificant impact on system speed and product throughput. For example, a scale with ten weighing buckets 17 provides 1023 possible weight combinations during a weighing cycle when the tare weight is updated in accordance with the invention. In contrast, a ten bucket system tared according to prior art methods would have only 511—a reduction of one half. As a result of this reduction, the system's ability to approximate target weight is substantially reduced. Because of the increased accuracy of the method according to the invention, there is reduction of the average excess product weight in each package. Over many cycles, this savings of products becomes substantial and represents a significant monetary savings.

I claim:

1. A method of measuring tare weights in an automatic combination weighting machine having N weighing buckets with each bucket having at least two compartments of which only one is filled at any given time with produce whose weight is a fraction of a target weight, said method comprising the steps of:
   (a) measuring the gross weight of each of the N buckets;
   (b) subtracting a stored predetermined tare weight of each bucket form the gross weight in order to find the net weight of the producet held in the filled compartment of each bucket;
   (c) dumping the product from the filled compartment of the M buckets which contain the combination of M net weights whose total weight most closely approximates said target weight, where M is less than or equal to N;
   (d) refilling the previously empty M buckets with product;
   (e) repeating the weight cycle defined by steps a, b, c, and d so as to create a cyclic repetition of finding combinations of net weights which most closely approximate the target weight;
   (f) interrupting said cyclic repetition after step (c) but before step (d) in a given cycle;
   (g) measuring the tare weight of the M buckets emptied in the given cycle and replacing the stored tare weight values for these M buckets with the measured tare weight values;
   (h) filling the M buckets with product; and
   (i) resuming the cyclic repetition of step e by sequentially executing steps a, b, c and d.

2. A method as set forth in claim 1 wherein said cyclic repetition is interrupted after a predetermined number of weighting cycles have occurred since the last interruption.

3. A method as set forth in claim 1 wherein said cyclic repetition is interrupted after a predetermined time period has elapsed since the last interruption.

4. A method as set forth in claim 1 wherein each bucket steps (c) and (d) of the method occur simultaneously by filling the empty compartments of said M buckets as the filled compartments are emptied.

5. A method as set forth in claim 4 wherein said cyclic repetition interruption is initiated by preventing the simultaneous filling of the empty compartments of the M buckets.

6. A method as set forth in claim 5 including the steps of:
   (i) shuttling back and forth a door mounted beneath each of the lower ends of said buckets between (1) a first position in which the door opens the lower end of said first compartment and closes the lower end of said second compartment and (2) a second position in which the door closes the lower end of said first compartment and opens the lower end of said second compartment; and
   (j) moving said door from said first position toward said second position at substantially the same time the product starts dropping to said first compartment and moving said door from said second position toward said first position at substantially the same time the product starts dropping to said second compartment whereby product may be dropped to one compartment while product is dropping out of the other compartment.

7. A method of measuring tare weights in an automatic combination weighing machine having N weighting buckets with each bucket having at least two compartments of which only one is filled at any given time, said method comprising the steps of:
  (a) measuring the gross weight of each of the N buckets and substracting therefrom the corresponding stored tare weight to provide a net weight and finding a combination of M net weights closest to a predetermined target weight, where M is less than or equal to N;
  (b) emptying the filled compartments of said M buckets corresponding to said combination of M weights;
  (c) filling the empty compartments of said M buckets as the filled compartments are emptied;
  (d) repeating the weighing cycle defined by steps a, b and c;
  (e) interrupting the repeated weighing cycles by ending the most recent cycle by not executing step c;
  (f) measuring the weight of each of the unfilled M buckets;
  (g) storing each of the measured weights of the M buckets as the new stored tare weights for respective ones of those M buckets; and
  (h) resuming the cyclic repetition of step d by sequentially executing steps a, b and c.

8. A method as set forth in claim 7 wherein the repetition of steps a, b and c is interrupted after a predetermined number of repetitions have occurred.

9. A method as set forth in claim 7 including the steps of:
  (i) shuttling back and forth a door mounted beneath each of the lower ends of said buckets between (1) a first position in which the door opens the lower end of said first compartment and closes the lower end of said second compartment and (2) a second position in which the door closes the lower end of said first compartment and opens the lower end of said second compartment; and
  (j) moving said door from said first position toward said second position at substantially the same time the product starts dropping to said first compartment and moving said door from said second position toward said first position at substantially the same time the product starts dropping to said second compartment whereby product may be dropped to one compartment while product is dropping out of the other compartment.

* * * * *